Jan. 27, 1942.    J. G. HARGRAVE ET AL    2,271,296
COURSE-INDICATING APPARATUS FOR VEHICLES
Filed May 13, 1940

Patented Jan. 27, 1942

2,271,296

UNITED STATES PATENT OFFICE 2,271,296

COURSE-INDICATING APPARATUS FOR VEHICLES

John Gordon Hargrave, Kings Langley, and Denis Cedric Williams, London, England

Application May 13, 1940, Serial No. 334,963 In Great Britain May 9, 1939

5 Claims. (Cl. 88—24)

This invention relates to light transmission apparatus by which any portion of a design, picture, photograph, map or otherwise, mounted to be moved in its plane in two directions mutually at right angles can be reproduced on a screen (forming part of the apparatus) by projection or reflection or any desired combination thereof, such an apparatus having been described in the specification of applicants' co-pending U. S. A. patent application Serial No. 306,010, filed on the 24th of November, 1939. This latter, however, is characterized by the fact that the means carrying the map or the like (termed the slide) is so constructed and mounted in the apparatus that the setting or direction of the slide (in relation to the vehicle) is controllable by gyroscopic means included in the apparatus or otherwise carried by the vehicle.

In general, according to the chief feature of the present invention there is provided in the optical path beyond the design, picture, photograph, map or otherwise that it is desired to transmit, an optical system at least part of which is mounted to move under the control of a direction-responsive device (such for example as a gyroscope) in order to rotate the image produced by the light beam traversing the system.

Thus the same effect is produced as in the structure of the apparatus of the before-mentioned application but the necessity of rotating the slide is avoided.

When the apparatus is mounted in a vehicle, such for example as an aeroplane, the rotation of the image may have any desired relationship with the angle steered through (about a vertical axis) and may be equal thereto or any desired function thereof and either in the same direction or in the reverse direction.

The co-operative arrangement of the optical system and the direction-responsive control means can be such as to provide for the synchronous turning of the image with the change of direction of the vehicle whilst maintaining the actual axis of projection (and rotation) constant.

With arrangements according to the invention the image of the map or the like, which may for example be constituted by a translucent slide, may be in reverse.

In addition to the main feature of the invention, means are provided for imparting movement of progression to the slide (in accordance with the course being moved over by the vehicle), this latter means being driven from a motor the speed of which can be regulated (automatically or otherwise) in accordance with the progression of the vehicle. Further, this last-mentioned means can, where required, also be controllable by the direction-responsive device.

Thus, where required, the two means subject to the control of the direction-responsive device can be directly or indirectly intergeared, in accordance with the precise arrangements.

In order that the invention may be better understood, it will now be described with reference to the accompanying drawing, which is given by way of example only.

For convenience and shortness of description the parts of the present construction are similar to the parts in the construction particularly described and illustrated in the specification of the aforesaid application.

Figure 2:
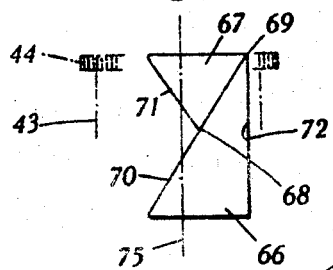
Fig. 2 shows in elevation the movable portion of the optical system as utilized in the structure shown in Fig. 1.
Figure 4:
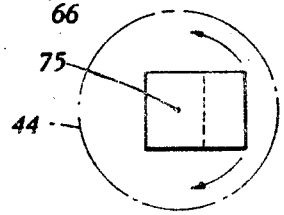

Fig. 4 a plan of Fig. 2.

It should be here explained that although the apparatus in accordance with the invention may itself include gyroscopic means, yet the gyroscopic control can be effected from other gyroscopic means mounted for other purposes in the vehicle, for example in the aeroplane or otherwise.

Such gyroscopic means as previously employed give what may be termed a standard orientation or datum upon which the apparatus can work and may include in their structure, or have associated therewith, servo-motor means, to give the necessary mechanical energy to carry out the various movements.

In the drawing no diagrammatic representation of the gyroscopic means has been shown but portions of two shafts 8 and 8ᵃ each adapted to be suitably driven from the gyroscopic control means.

Thus, it generally must be understood that each of these shafts 8 and 8ᵃ receives directly or through servo-motor means, turning movements or rotations or partial rotations due to its control from a gyroscopic mass.

Figure 1:
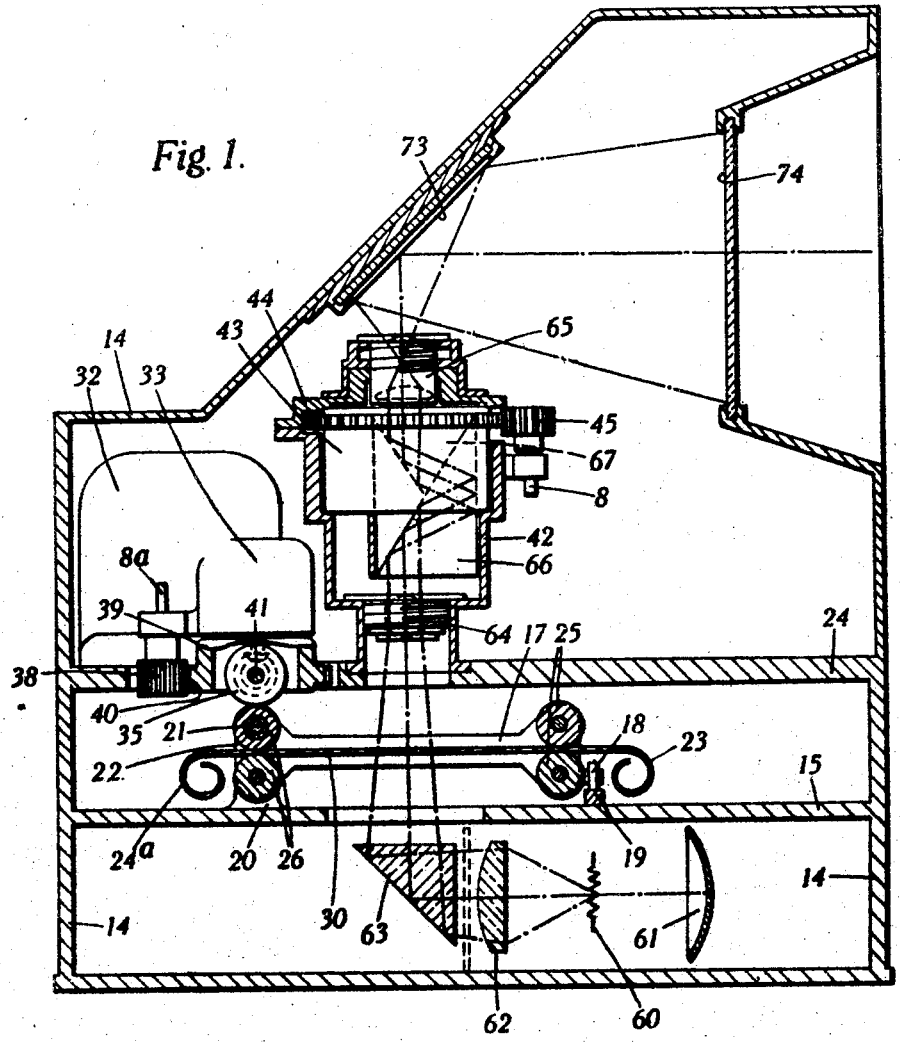
Fig. 1 shows a sectional elevation of an apparatus constructed according to the invention, for mounting in an aeroplane.

Briefly, the apparatus shown in Fig. 1 comprises a casing 14 having two fixed internal supporting surfaces 15 and 24. The first of these replaces the turntable 15 of the previous specification and carries the slide adapted to have movements in a horizontal plane in two directions mutually at right angles.

For this purpose the mechanism may be any suitable to conform to the conditions. However, in accordance with the particular conditions whereby the longitudinal direction of a set course is much greater than the transverse deviations from the course, this slide is constructed from a carriage 17 mounted at one end on rollers 18 to move on a guide 19 carried by the fixed support 15. At the other end the support carries brackets 20 for a fixed rod 21, which latter is parallel to the guide 19 and has co-operating therewith sliding bearings 22 comprised by the carriage 17. Thus, to move the carriage 17 in the transverse direction the rollers 18 run on the guide 19 and the bearings 22 move over the fixed rod 21.

To allow for the much greater dimensions in the longitudinal direction, it is of course obvious that a similar guiding structure such as that described with regard to 19 and 21 could be utilised in a direction at right angles to the said guides 19 and 21. However, this would unduly increase the dimensions of the apparatus. Consequently, as an equivalent, for movement in this direction the slide, having the exemplification of a flexible film, is associated with let-off means 23 and take-up means 24ª, these latter being but sketchily illustrated in the drawing. For the purpose of movement in this longitudinal direction, however, a pair of gripping rollers 25 is provided at one end and another pair 26 at the other end, these rollers being suitably intergeared. Although not absolutely necessary, in some cases the rollers 25 and 26 may have associated therewith, or their spindles may have mounted thereon, toothed sprocket wheels definitely engaging sprocket perforations in the edges of the film 30 constituting the slide.

The structure of the carriage and its associated parts has been but sketchily described but is similar to that described in the aforesaid specification.

The supporting surface 24 carries the driving motor 32 which constitutes the driving means for the progression of the slide. This motor may be of any type but preferably is an electric motor receiving current from desired leads.

The motor is set to drive in accordance with the speed of the vehicle and drives through reduction gearing a progress wheel 35 which meshes with the upper roller 26. The reduction gearing may be of a high order, for example 20,000:1. In other words, the progress drive of the slide is but slight as compared with other movements of the apparatus.

It should be explained that the motor has a one-direction drive but that owing to the setting it is necessary the progress wheel 35 should cause the slide to move longitudinally in one direction or the other. Thus it is necessary to provide means by which this progress wheel 35, although constantly driven in one direction by the motor, may be turned about a vertical axis.

In this manner when so turned, if this turning is through 180°, the relative drive of the slide is reversed in the longitudinal direction. If, however, only turned through 90°, the longitudinal drive is entirely eliminated but a transverse drive is effected. Further, in intermediate positions the drive for the slide has both a longitudinal and a transverse component.

To carry out the above objects, suitable speed reduction gearing is provided in a casing 33 in association with the motor, the final vertical shaft carrying a rotary housing 39 having on the exterior a gear 40 which meshes with a driving pinion 38 mounted on the shaft 8ª.

Across the housing 39 in a diametrical position is a driven spindle 41 carrying the progress wheel 35, by a key or otherwise.

The relative sizes and arrangement of the gears are such that the vertical axis of the gear 40 is turned through 180° when the vehicle moves through 180°.

The support 24 also carries a fixed casing 42, of generally cylindrical nature, arranged vertically with the axis in the optical projection axis. In the lower and upper portions this carries lens systems to be hereafter described and in an intermediate position has mounted to rotate therein a sleeve 43 having a toothed flange 44 meshing with a pinion 45 on the end of the shaft 8. The sleeve carries the movable portion of the optical system.

The optical system comprises a light source 60 operating in conjunction with a reflector 61 and a condenser 62 in conjunction with a right-angled prism 63 the normal reflecting surface of which may additionally be silvered or otherwise metallised to give total reflection.

This diverts the optical axis vertically to bring it into the vertical axis of the casing carrying the portion of the optical system which is located beyond the slide.

This latter includes a lower lens system 64 adapted for the purpose of the invention and an upper lens system 65 also similarly adapted. In conjunction with the upper lens system, this preferably includes means by which the optical beam is enabled to cross as well as an iris diaphragm. Between the two lens systems 64, 65 there is included a double prismatic structure including three reflecting surfaces.

Figure 3:
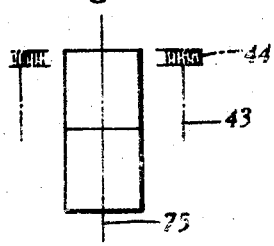
Fig. 3 shows a side view of Fig. 2.

These are amply illustrated in Figs. 2, 3 and 4 and comprise a lower prism 66 and upper prism 67. These are cemented together on the contact surfaces represented from 68 to 69 and have aluminised or otherwise metallised, for example silvered, surfaces 70 and 71 and also possibly 72. The arrangement is such that, as shown in Figs. 1, 2, 3 and 4, any beam reaching the surface 70 is reflected to the surface 72, thence to the surface 71 and thence again reflected to come coaxial with the primary beam projection into the prism system.

The whole device rotates around the prismatic axis 75 (also represented by the centre 75 in Fig. 4) so that the image projected from the film plane or slide impinging upon the surface 70 has the angular distortions indicated in Figs. 1 and 2 but is projected from the prism 67 through the upper lens system.

In this manner if there is any movement of the prismatic portion controlled by the gear wheel 44, then the image must of necessity be rotated.

It is obvious many other optical systems may be utilised to obtain this result and consequently the invention is not limited to the particular example given.

The relative rotations of the gear 40 and the gear 44 may be as desired and according to the particular system utilised. For example, the gear 40 may have two rotations to one of the gear 44. Again (depending on the system) they may rotate in the same or opposite directions.

The optical system shown is such that the condenser 62 and prism 63 together with the other preliminary details are of such nature that there is a slight convergence through the slide or film to the lens system 64 after which the beam is of a parallel nature and remains such passing through the movable prisms until reaching a field lens and the final emerging lens. Here the arrangement is such that the beam has a crossing point between the field lens and the emerging lens on to the reflector 73 which is of any suitable nature, for example an aluminised or silvered surface, on to the screen 74.

The invention may be carried into effect in a great variety of manners other than those particularly described both as regards the means for giving the normal progression of the film or the like, together with the means for giving the movement in two directions mutually at right angles to the said film or the like.

The basic feature of the invention, however, is that subsequent to the beam including the image, the optical system includes means by which it is rotated responsive to a direction-control device.

In some cases means are provided in association with the map or the like to be transmitted so that it, or one or both of its guideways, can have applied thereto suitable adjustments or corrections (for example from controlling knobs or handles) in accordance with modifications in the direction and/or strength of the wind, with or without further corrections for the air speed in the case of an aeroplane. Further, the arrangement may be such that one or more of such corrections may be applied automatically.

The image in most cases is rendered visible upon a screen or the like although a system of "aerial" focussing may be provided so as to obtain an "aerial" image. According to one arrangement, such "aerial" focussing can be obtained by providing an optical system which incorporates a double convex lens and a convex-concavo lens, the lenses being arranged so that the light beam, after a final reflection, passes through the double convex lens and then through the convex-concavo lens, a surface of the convexity of which is located adjacent a surface of the double convex lens.

In certain arrangements of the apparatus means are provided whereby a compass diagram can be projected on to the screen or other viewing means, said compass diagram being adapted to rotate in accordance with the determinations of the direction-responsive device. Such an arrangement can, for example, include a transparency bearing any suitable compass diagram or "gyro rose" that is rotatably mounted in the optical path of the projection system and preferably closely adjacent the map or the like. This transparency is operatively connected with the direction-responsive device in order that it may receive from the latter the appropriate rotary movement which will have for effect to rotate the image of the compass diagram on the viewing screen.

Conveniently, the said transparency can be associated with the movable optical system aforesaid, for instance between the double prism in the system given by way of example and the map or the like.

By reason of such an arrangement there is obtained an efficient compass device that may constitute a main compass or an auxiliary compass for use during an emergency, for example if the main compass should break down.

The invention is not limited to the precise forms or details of construction described, as these may be varied to suit particular cases.

What we claim and desire to secure by Letters Patent of the United States of America is:

1. An automatic course-indicating apparatus for vehicles, including within a casing provided with a viewing screen, two horizontal supporting walls arranged in spaced relation one above the other, a slide on the lower one of said two horizontal walls and horizontally movable in two directions mutually at right angles to each other, a transparent representation of a map or the like, mounted on said slide, means in the lower portion of said casing for illuminating said map on said slide from below, driving means on the upper one of said two horizontal walls and operatively connected with said slide for moving the same proportionately in accordance with the speed and direction of the vehicle, and an image projecting system mounted with its optical axis at a right angle to said slide on the upper one of said two horizontal walls for projecting an image of the illuminated portion of said map onto said viewing screen, said image projecting system including, a tubular casing fixed to said upper horizontal wall, a lens system mounted in the upper portion of said tubular casing, a second lens system mounted in the lower portion of said tubular casing, and a sleeve rotatably mounted in said tubular casing between said two lens systems and containing a prismatic light reflecting system, and means for rotatably adjusting said rotatable sleeve in accordance with the direction of movement of the vehicle to rotate the image of said map appearing on said viewing screen.

2. An automatic course-indicating apparatus for vehicles, including within a casing provided with a viewing screen, two horizontal supporting walls arranged in spaced relation one above the other, a slide on the lower one of said two horizontal walls and horizontally movable in two directions mutually at right angles to each other, a transparent representation of a map or the like, mounted on said slide, means for illuminating said map on said slide from below, driving means on the upper one of said two horizontal walls and operatively connected with said slide for moving the same proportionately in accordance with the speed and direction of the vehicle, and an image projecting system mounted with its optical axis at a right angle to said slide on the upper one of said two horizontal walls for projecting an image of the illuminated portion of said map onto said viewing screen, said image projecting system including a tubular casing fixed to said upper horizontal wall, a lens system mounted in the upper portion of said tubular casing, a second lens system mounted in the lower portion of said tubular casing, and a sleeve rotatably mounted in said tubular casing between said two lens systems and containing light reflecting means, and means for rotatably adjusting said rotatable sleeve in accordance with the direction of movement of the vehicle to rotate the image of said map appearing on said viewing screen.

3. An automatic course-indicating apparatus for vehicles, including within a casing provided with a vertical viewing screen, two horizontal supporting walls arranged in spaced relation one above the other and in planes below the lower end of said viewing screen, a slide on the lower one of said two horizontal walls and horizontally movable in two directions mutually at right angles to each other, a transparent representation of a map or the like, mounted on said slide, an aperture in the lower wall directly below said slide, means in said casing below said lower wall for illuminating said map on said slide through said aperture, driving means on the upper one of said two horizontal walls and operatively connected with said slide for moving the same in accordance with the speed and direction of the vehicle, and an image projecting system mounted on the upper one of said two horizontal walls for projecting an image of the illuminated map portion onto said viewing screen, said image projecting system including a tubular casing fixed with its axis perpendicular to said upper horizontal wall, a lens system mounted in the upper portion of said tubular casing, a second lens system mounted in the lower portion of said tubular casing, a sleeve rotatably mounted in said tubular casing between said two lens systems and containing a prismatic light reflecting system, and means in spaced relation above said tubular casing for reflecting the image of said map onto said vertical viewing screen, and means for rotatably adjusting said rotatable sleeve in accordance with the direction of movement of the vehicle to rotate the image of said map appearing on said viewing screen.

4. An automatic course-indicating apparatus for vehicles, including within a casing provided with a viewing screen, two horizontal supporting walls arranged in spaced relation one above the other, a slide on one of said two horizontal walls and horizontally movable in two directions mutually at right angles to each other, a transparent representation of a map or the like, mounted on said slide, means for illuminating said map on said slide, driving means on the other one of said two horizontal walls and operatively connected with said slide for moving the same in accordance with the speed and direction of the vehicle, and an image projecting system mounted with its optical axis at a right angle to said slide on said last named horizontal wall for projecting an image of the illuminated map portion onto said viewing screen, said image projecting system including a tubular casing fixed to said last named horizontal wall, a lens system mounted in the upper portion of said tubular casing, a second lens system mounted in the lower portion of said tubular casing, and a sleeve rotatably mounted in said tubular casing between said two lens systems and containing a prismatic light reflecting system, and means for rotatably adjusting said rotatable sleeve in accordance with the direction of movement of the vehicle to rotate the image of said map appearing on said viewing screen.

5. An automatic course-indicating apparatus for vehicles, including within a casing provided with a viewing screen, two horizontal supporting walls arranged in spaced relation one above the other, a slide on the lower one of said two horizontal walls and horizontally movable in two directions mutually at right angles to each other, a transparent representation of a map or the like, mounted on said slide, means for illuminating said map on said slide from below, driving means on the upper one of said two horizontal walls and operatively connected with said slide for moving the same proportionately in accordance with the speed and direction of the vehicle, and an image projecting system mounted with its optical axis at a right angle to said slide on the upper one of said two horizontal walls for projecting an image of the illuminated portion of the map onto said viewing screen, a tubular casing in which said image projecting system is mounted fixed to said upper horizontal wall, said image projecting systems including at least one part, which is rotatably mounted in said tubular casing, and means for rotatably adjusting said rotatable part in accordance with the direction of movement of the vehicle to rotate the image of said map appearing on said viewing screen.

JOHN GORDON HARGRAVE.
DENIS CEDRIC WILLIAMS.